(12) United States Patent
Wang et al.

(10) Patent No.: US 9,251,609 B1
(45) Date of Patent: Feb. 2, 2016

(54) TIMELINED SPIDER DIAGRAMS

(71) Applicant: CA, Inc., Islandia, NY (US)

(72) Inventors: Hao Wang, Beijing (CN); Shujun Wang, Beijing (CN); Jing Lin, Beijing (CN)

(73) Assignee: CA, Inc., Islandia, NY (US)

(*) Notice: Subject to any disclaimer, the term of this patent is extended or adjusted under 35 U.S.C. 154(b) by 388 days.

(21) Appl. No.: 13/784,520

(22) Filed: Mar. 4, 2013

(51) Int. Cl.
*G06T 11/20* (2006.01)

(52) U.S. Cl.
CPC .................................. *G06T 11/206* (2013.01)

(58) Field of Classification Search
None
See application file for complete search history.

(56) References Cited

U.S. PATENT DOCUMENTS

| | | | | |
|---|---|---|---|---|
| 5,615,347 | A * | 3/1997 | Davis et al. | 715/833 |
| 7,216,116 | B1 * | 5/2007 | Nilsson et al. | 1/1 |
| 2002/0013631 | A1 * | 1/2002 | Parunak et al. | 700/28 |
| 2003/0033233 | A1 * | 2/2003 | Lingwood et al. | G06Q 10/06398 705/36 R |
| 2007/0156565 | A1 * | 7/2007 | Singer et al. | 705/37 |
| 2008/0155416 | A1 * | 6/2008 | Oitaira | 715/716 |
| 2010/0079464 | A1 * | 4/2010 | Matsumura | G06F 17/2785 345/440 |
| 2012/0101919 | A1 * | 4/2012 | Waks et al. | 705/30 |
| 2013/0317739 | A1 * | 11/2013 | Coulmeau et al. | 701/465 |

OTHER PUBLICATIONS

M. Joan Saary, Radar Plots: A Useful Way for Presenting Multivariate Health Care Data, 2008, Journal of Clinical Epidemiology, 60:311-317.*
Clifton Forlines, Kent Wittenburg, Wakame: Sense Making of Multi-Dimensional Spatial-Temporal Data, 2010, Proceedings of the International Conference on Advanced Visual Interfaces AVI '10, pp. 33-40.*
Christian Tominski, James Abello, Heidrun Schumann, Interactive Poster: Axes-Based Visualizations for Time Series Data, 2005, Poster Compendium of IEEE Symposium Information Visualization (InfoVis '05).*
Steven Hackstadt, Allen Malony, Visualizing Parallel Programs and Performance, 1995, IEEE Computer Graphics and Applications, 15(4):12-14.*
Holger Schultz, Stefan Speckesser, Gunther Schmid, Benchmarking Labour Market Performance and Labour Market Policies: Theoretical Foundations and Applications, 1998, WZB Discussin Paper, No. FSI98-205, pp. 38-56.*

* cited by examiner

*Primary Examiner* — Xiao Wu
*Assistant Examiner* — Michael J Cobb
(74) *Attorney, Agent, or Firm* — Gilliam IP PLLC; Matt Baca

(57) ABSTRACT

Various embodiments illustrated and described herein include at least one of systems, methods, and computer program product to manage data having multiple groups that vary over time. Some embodiments use a spider diagram, in conjunction with a timeline, to allow a user to visualize the data. Such embodiments can include controls that allow a user to indicate a time along the timeline for which data should be plotted on the spider diagram. Some embodiments provide controls that allow a user to select a time range for which characteristics of data should be plotted on the spider diagram such as minimum, maximum and average for each data group over the time interval. Some embodiments visually indicate values that fall within certain criteria, such as a marginal criteria or an unacceptable criteria.

9 Claims, 8 Drawing Sheets

TIMELINED SPIDER DIAGRAMS

TECHNICAL FIELD

The disclosure relates generally to user interfaces, and more particularly, to a user interface for viewing time varying information.

BACKGROUND

In many situations, systems can generate a large amount of time varying information. In order to understand what is happening, various mechanisms have been developed to present the information in a variety of formats to try to help a user visualize what is happening behind the data. However, presenting time varying data in an understandable way remains a challenge.

BRIEF DESCRIPTION OF THE DRAWINGS

The present technology is illustrated by way of example, and not by way of limitation in the figures of the accompanying drawings.

DETAILED DESCRIPTION

Figure 1:
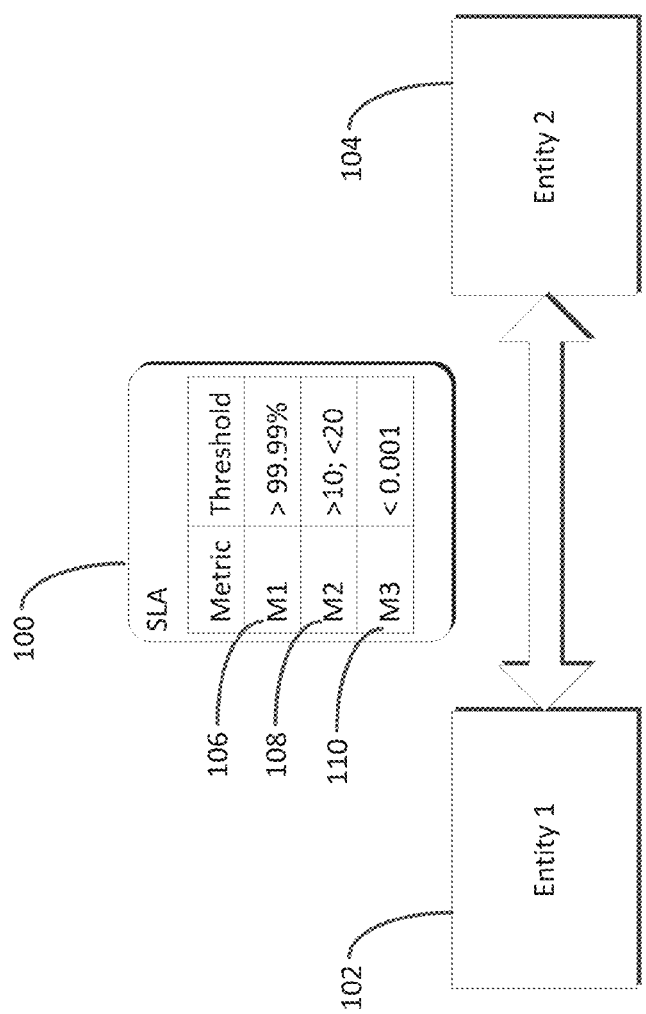
FIG. 1 illustrates an example service level agreement between two entities.

The description that follows includes systems, methods, techniques, instruction sequences, and computing machine program products that embody illustrative embodiments of the present disclosure. In the following description, for purposes of explanation, numerous specific details are set forth in order to provide an understanding of various embodiments of the inventive subject matter. It will be evident, however, to those skilled in the art that embodiments of the disclosed subject matter may be practiced without these specific details. In general, well-known instruction instances, protocols, structures, and techniques have not been shown in detail.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Many systems and environments generate sets (sometimes referred to as groups) of time varying data. These sets or groups are characterized by a sample for each group member at each time. In general the data is all sampled at the same time, but in some systems data of the various group members can be sampled at different times. Often the groups are interrelated in some fashion, either because they are interrelated or correlated in some degree or because they relate to some larger group or category. For example, in an engine control situation, a collection comprising a set of engine rpm data, a set of fuel/air mixture data, and a set of engine timing data may all be interrelated in some complex fashion. In another example, a collection comprising a group of response time data, a group of up-time data, and a group of dropped packet data may be related as metrics measured as part of a Service Level Agreement (SLA) between an entity providing computing services and an entity paying for the services. In any of these examples or situations where groups of time varying data exist, it can be difficult to evaluate the data to comprehend the larger picture.

Embodiments herein are directed to various aspects of managing and visualizing sets of time varying data. In this description, the terms 'group' and 'set' are used interchangeably. Additionally, the examples presented often use collections of SLA data and metrics as a basis for explanation. However, various embodiments herein can be applied to any collection of multiple groups of time varying data. Thus, except where specifically claimed, the embodiments herein are not limited to SLA data.

FIG. 1 illustrates a general example of an SLA 100, between two entities 102 and 104. In general an SLA defines the level of service required between two entities. For example, one entity may provide email service to another. In providing the service, the email service provider may be obligated to provide a monthly uptime availability of >99.9%, a response time from of <1 sec., and a storage capacity per user of 20 Gb minimum. As illustrated in FIG. 1, metrics that are part of an SLA can be a maximum (e.g. measured data must be less than some threshold) as illustrated by M1 106, a minimum value (e.g. measured data must be greater than some threshold) as illustrated by M3 110, or two sided (e.g. measured data must be between some minimum and maximum threshold) as illustrated by M2 108. The metrics can generally be any measured value. The metrics can be independent (e.g. response time independent of loading level), or may be related to each other (e.g. a certain response time at a certain loading level).

Figure 2:
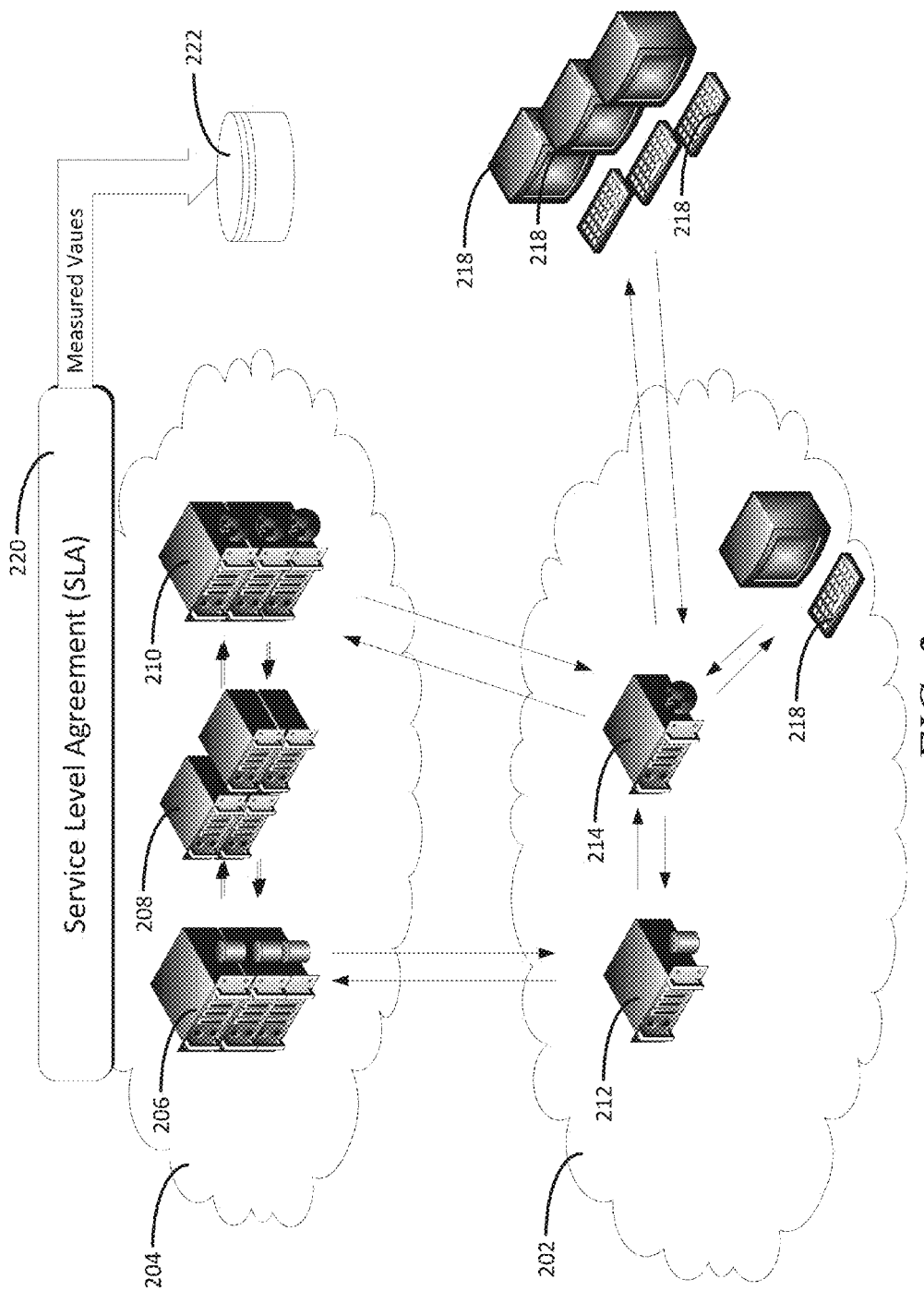
FIG. 2 illustrates an example embodiment where a service level agreement might be in place.

FIG. 2 illustrates an example embodiment where a service level agreement might be in place. In FIG. 2, one entity 202 procures various computing services such as database server services, illustrated by 206, application server services, illustrated by 208 and web server services, illustrated by 210 from another entity 204. Such services may be used to provide services to various users (218) directly or may be used in conjunction with services provided by entity 202 itself (e.g. database server 212 and web server 214). In an embodiment such as that illustrated in FIG. 2, an SLA 220 may govern the level of service required in various ways for each of the services provided. SLA 220 may identify required levels on items like uptime availability, error rates, response times, mean time between failures, mean time to repair, data recoverability, or any other technical aspects. Measured values in each of the areas identified by the SLA may be stored in a database as illustrated by 222 in FIG. 2 or other location for later analysis to determine compliance with the SLA. Alternatively (or additionally), the data may simply be stored in a file (e.g. text, binary, comma separated values (CSV), excel or other spreadsheet type file, or any other file type). Thus, the measured values for each metric become a group of data in a collection that relates to the SLA.

Figure 3:
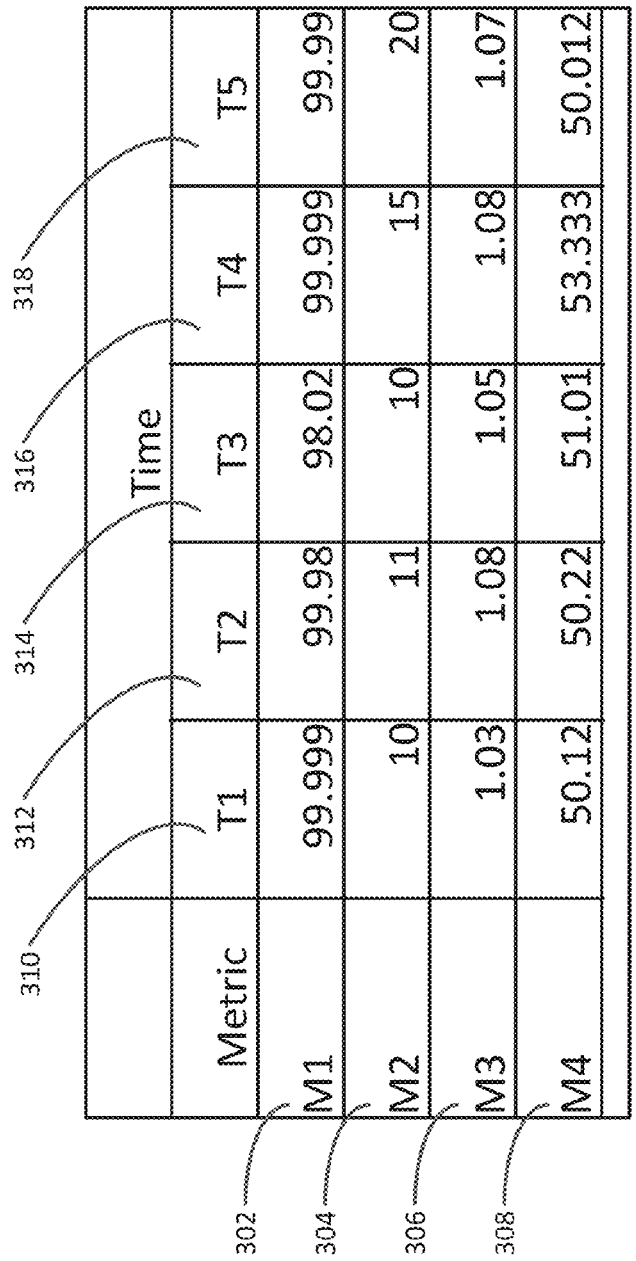
FIG. 3 illustrates an example of multiple time varying data groups.

FIG. 3 illustrates an example of multiple time varying data groups. The table of FIG. 3 contains metrics M1 302, M2 304, M3 306, and M4 308. Values for these metrics have been measured at times T1-T5 (310, 312, 314, 316, 318). These metrics may represent any of the technical aspects of the SLA.

Figure 4:
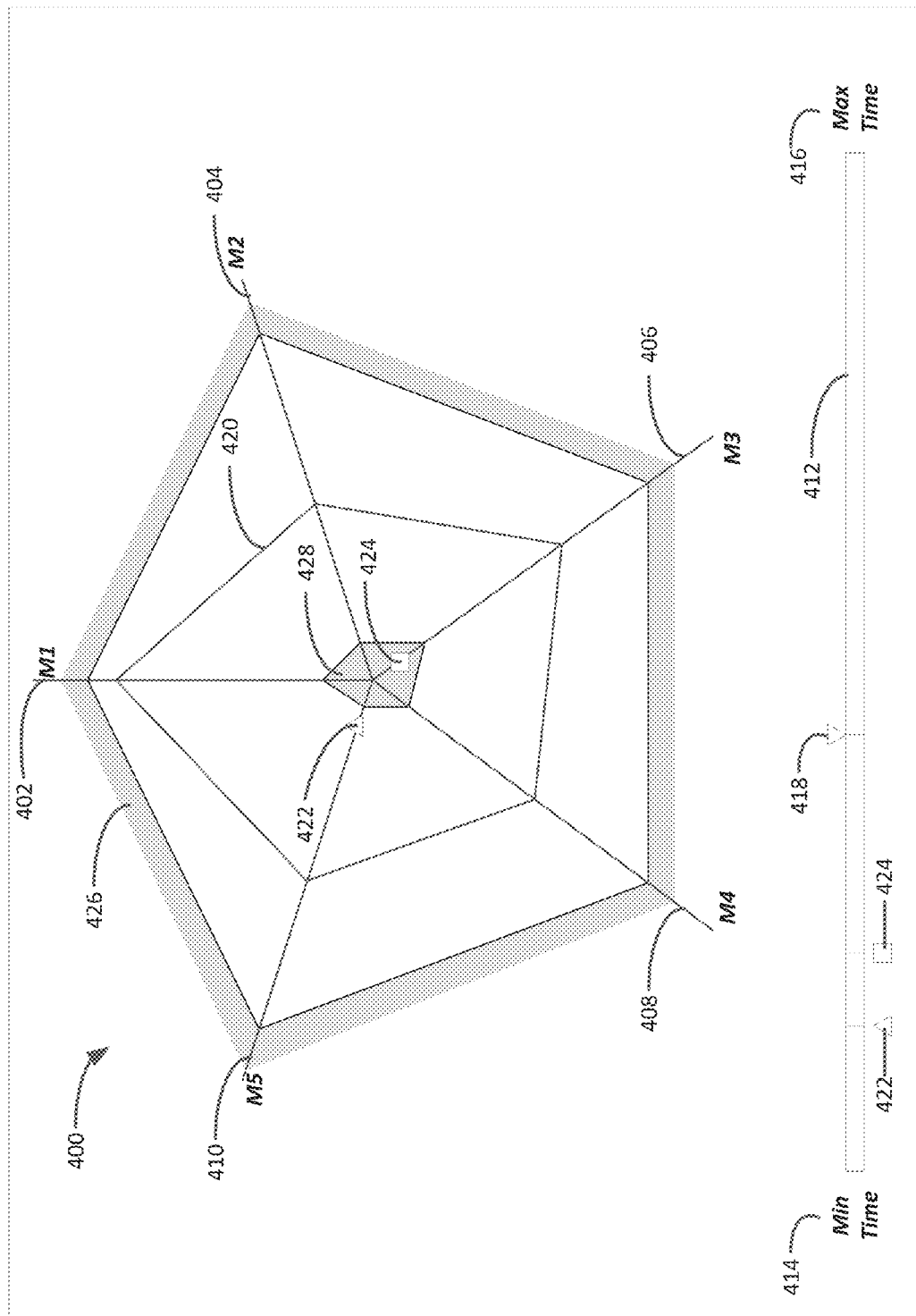
FIG. 4 illustrates an example embodiment of a timelined spider diagram and interface.

FIG. 4 illustrates an example embodiment of a timelined spider diagram and interface. The diagram and interface has one area 400 that is devoted to a spider diagram. These types of diagrams are also referred to as a radar diagram, star diagram, or web diagram. Also, chart can be used in place of diagram. A spider diagram is a graphical method of representing multivariate data in the form of a two-dimensional chart where three or more variables are represented on axes starting from the same point. In FIG. 4, five metrics M1-M5 are represented along 5 axes labeled 402, 404, 406, 408, and 410, respectively. Each axis can be scaled so that as the values measured for M1-M5 over a given time period from some minimum time to some maximum time can be plotted and will fall along its respective axis.

The diagram and interface in FIG. 4 also has a timeline 412 extending from minimum time 414 to maximum time 416 of interest. The minimum time and maximum time can be set using a relevant data set or it can be set by a user of the interface to extract a data set of interest into the interface and diagram.

When used as an interface, FIG. 4 can also contain a mechanism for a user to indicate a time of interest within the minimum and maximum time limits. In some embodiments, this may be done by moving the cursor to a time of interest within timeline 412. In other embodiments, the user may click within timeline 412 where a time indicator, such as time indicator 418, should be placed. In still other embodiments as the user hovers within timeline 412, a time indicator, such as time indicator 418 appears and if a user clicks on a particular location, time indicator 418 will become fixed at that time. In further embodiments, a text box or other input mechanism can allow a user to enter a particular time of interest. In still other embodiments, a time code (not shown) within the timeline 412 can be displayed as a user moves within timeline 412 or places/moves time marker 418 within timeline 412.

As a user indicates a time of interest (by, for example, hovering the cursor within timeline 412 or placing/manipulating time marker 418) the values of the data can be plotted on spider diagram 400. In FIG. 4, the plotted points/lines 420 indicate the values of metrics M1-M5 at time T (the location of time marker 418).

In situations where a timelined spider diagram is used to illustrate/manipulate data that should stay within designated bounds, a visual indication of both the boundaries and a visual indication of where the data is close to/outside the bounds can be represented on the diagram. If all metrics on the diagram have an upper and lower boundary, this visual indication may include, for example, shaded areas representing where the boundaries lie. In FIG. 4, a minimum unacceptable boundary is illustrated by shaded area 428 and a maximum unacceptable boundary is illustrated by shaded area 426. Of course, of only a minimum or maximum unacceptable boundary exists, then only one need be shown. Unacceptable boundaries may be illustrated in a variety of ways including the shading illustrated in FIG. 4. Other mechanisms may be to indicate unacceptable areas on the axis using some other visual indicator (color coding or the like) or indicate them in some other fashion.

For example, if SLA data is used with a timelined spider diagram, a visual indication where data is close to or outside the parameters set by the SLA can be represented on the diagram (either in the spider portion 400 on the timeline 412 or both). Such a visual indicator can be color coding, a special marker or indicator, or any other mechanism. In one embodiment, a portion of the spider diagram can be color coded (e.g. the axis, line or segments of either (or both)). In another embodiment, color coding can be applied to the timeline. In still another embodiment, color coding can be applied to both the spider diagram and the timeline. In other embodiments symbols instead of or in addition to the color coding can be used.

Criteria can be established to identify when the value of a particular metric is considered to be marginal and when it is considered to be unacceptable and color coding and/or other visual indicators can follow accordingly. For example, if an SLA requires a monthly uptime availability of 99.9%, the metric can be color coded yellow if availability falls to within 0.2% (e.g. 99.92%) and color coded red if availability falls below 99.9%. Embodiments can combine various visual indicators in any combination (e.g. plotting a special symbol for marginal data and color coding something in the chart yellow, plotting a different symbol for unacceptable data and color coding something in the chart red). Basically the purpose is to allow a user to visually pick out areas where data is marginal or unacceptable. In FIG. 4, marker 422 is plotted on spider diagram 400 to indicate that at some point in the relevant time period (minimum time to maximum time) metric M5 reached a marginal state. Marker 422 is also plotted on timeline 412 to indicate where within the relevant time period the marginal data occurred. Marker 424 is plotted on the axis associated with metric M3 and plotted on timeline 412 to indicate that metric M3 was considered unacceptable at the value indicated on axis 406 and at the indicated time. Although not shown in FIG. 4, color coding can be used in addition to (or instead of) marker 422 and 424. For example, 422 can be coded yellow and 424 can be coded red. A user can also have the option of showing data points that are marginal or unacceptable or hiding them.

Although not shown on FIG. 4, it is also possible to display the values associated with various key features. For example labels can be attached to key features, such as the value where marker 422 is plotted on axis 410, the value where marker 424 is plotted on axis 406, the time values where markers 422 and 424 are plotted on timeline 412, the value of time T on timeline 412, the points plotted by lines 420 where they touch axes 402, 404, 406, 408 and 410, etc. Alternatively, some or all of these labels can be hidden until a user hovers a cursor (or brings the cursor close) over the relevant feature. Furthermore, such labels can be plotted close to the feature, close to the cursor, in a table and/or in some other manner/location.

Figure 5:
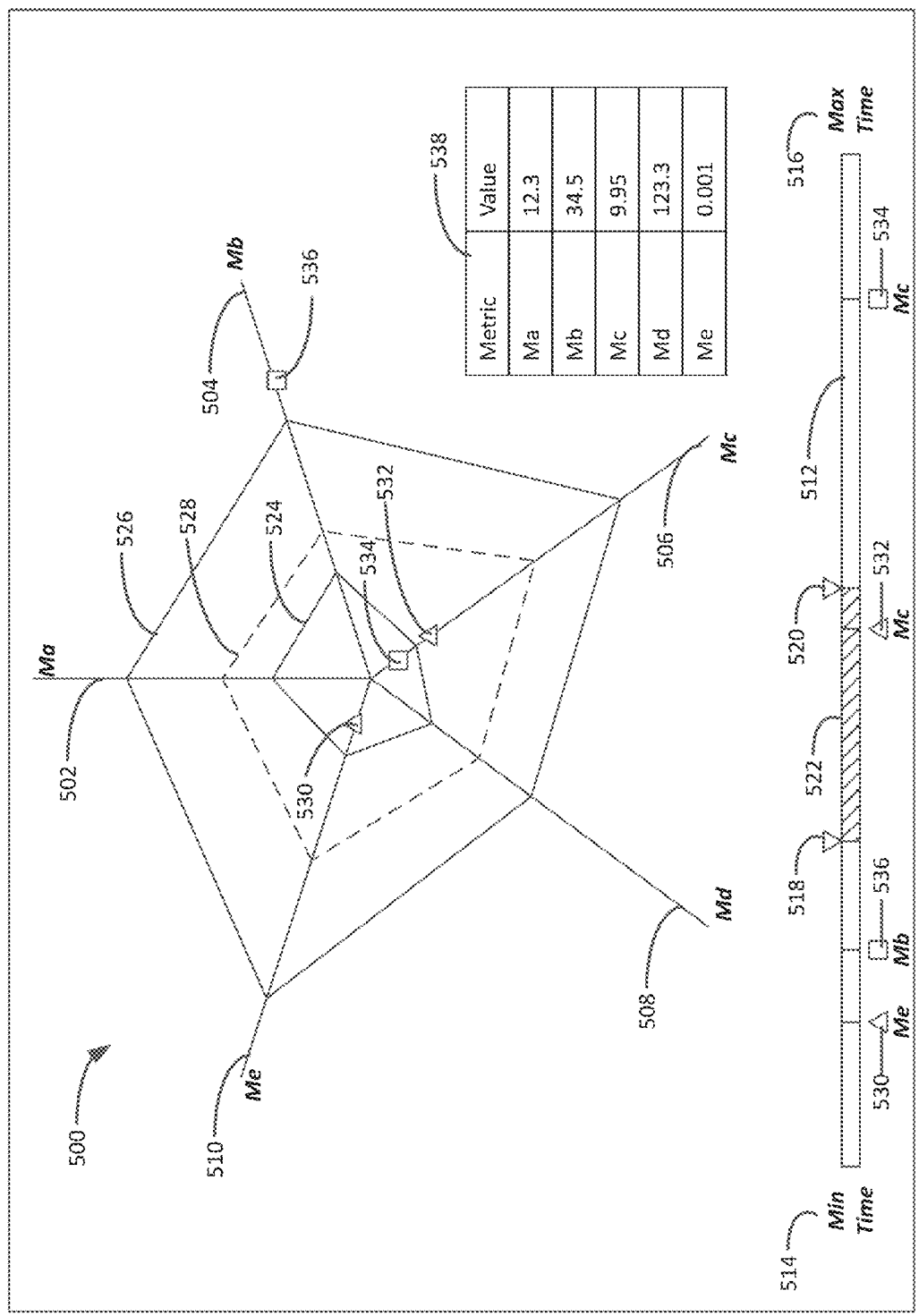
FIG. 5 illustrates an example embodiment of a timelined spider diagram and interface.

FIG. 5 illustrates another example embodiment of a timelined spider diagram and interface. FIG. 5 illustrates spider diagram 500, having axes 502, 504, 506, 508, 510 where values for metrics Ma, Mb, Mc, Md, and Me can be plotted, respectively. FIG. 5 also has timeline 512 extending from minimum time 514 to maximum time 516.

Rather than representing data from a single point in time on a timelined spider diagram, such as that illustrated in FIG. 4, it is also possible to represent data from a period of time. In the example of FIG. 5, such a time period is indicated by the time between start time marker 518 and stop time marker 520. The values of start time marker 518 (T1) and stop time marker 520 (T2) can be marked on timeline 512 as illustrated in FIG. 5. Start time marker 518 and stop time marker 520 can be inserted in many different ways, such as hovering a cursor where they should be inserted and clicking, dragging them from a location and placing them at the appropriate time in timeline 512, entering the values in a text box or through some other mechanism, or any other way. The time between start time marker 518 and stop time marker 520 can be illustrated in some way, such as color coding, or otherwise changing the appearance between the two markers. In FIG. 5, the appearance of timeline 512 between start time marker 518 and stop time marker 520 is altered as indicated by time period 522.

When a time period is selected, different functions of the values of the data in the time period can be plotted on the corresponding spider diagram. These functions can include any functions that can be generated from multiple data values. In FIG. 5, the minimum of the value for each metric, the maximum value for each metric, and the average of each metric is plotted as indicated by 524, 526 and 528 respectively. Various strategies can be used so a user can distinguish functions plotted on the spider diagram. Color coding, symbols, different line types, etc. can all be used, either alone or in any combination. In FIG. 5, the average is plotted with a different line type.

Criteria can be established to identify when the value of a particular metric is considered to be marginal and when it is considered to be unacceptable and color coding and/or other visual indicators can follow accordingly. Embodiments can combine various visual indicators in any combination (e.g. plotting a special symbol for marginal data and color coding something in the chart yellow, plotting a different symbol for unacceptable data and color coding something in the chart red). Basically the purpose is to allow a user to visually pick out areas where data is marginal or unacceptable. In FIG. 5, triangular symbols 530 and 532 indicate marginal data while square markers 534 and 536 indicate unacceptable data. These markers are plotted on the relevant axis to indicate which metric was marginal/unacceptable and the value of the marginal/unacceptable metric. The markers are also plotted on timeline 512 to indicate when the marginal/unacceptable values occurred. As indicated in FIG. 5, it may also be desirable to indicate which metric was marginal/unacceptable when indicating them on the timeline. In FIG. 5, marginal data symbols 530 and 532 and unacceptable data symbols 534 and 536 are labeled with their respective metrics when plotted on timeline 512. Other indicators may also be used to distinguish which metric is involved such as different symbols for different metrics, color coding and the like. Although not shown in FIG. 5, color coding can be used in addition to (or instead of) markers 530, 532, 534 and 536. For example, 530 and 532 can be coded yellow and 534 and 536 can be coded red. Alternatively, or in addition to, the color coding may be applied to areas of the chart such as axes, lines, the timeline or segments or portions thereof. Also, color coding may be used instead of symbols.

In FIG. 5 some marginal and unacceptable values fall outside the selected time period (530, 534 and 536). When this situation arises, the user can be presented with an option of either hiding or showing marginal and/or unacceptable values that fall outside the selected time period.

In addition, minimum unacceptable values and/or maximum unacceptable values can be illustrated on the diagram. Although not shown in FIG. 5, the mechanisms discussed in conjunction with FIG. 4 can be used. For example, minimum unacceptable value areas and/or maximum unacceptable value areas can be shaded, perhaps 10% or 15% darker than the surrounding area to indicate where the regions lie on the diagram. Alternatively, or additionally, they can be indicated on the individual axis somewhere. Color coding can be used, either color coding minimum unacceptable value areas and/or maximum unacceptable value areas either the same or different colors or shades. The same principles can be applied to marginal value areas in any combination with both marginal and unacceptable areas, or either marginal and unacceptable areas being shown on the diagram.

Sometimes a metric has only a minimum unacceptable value or a unacceptable maximum value. In these situations, the minimum and/or maximum unacceptable value can still be indicated as described above. However, for displaying values or the boundaries that are unbounded (e.g. minimum unacceptable values when there is only a maximum unacceptable boundary or vice s), the unbounded boundary may be normalized before being displayed in the diagram or the user may set the boundary point from empirical data or some other indication may be made that that side of the metric is unbounded such as different color shading, different shading patterns, or some other indication.

It is also possible to display the values associated with various key features. For example labels can be attached to key features, such as the value where marker 530 is plotted on axis 510, the value where marker 532 and/or 534 is plotted on axis 506, the value where marker 536 is plotted on axis 504, the time values where markers 530, 532, 534 and/or 536 are plotted on timeline 512, the value of time T1 and T2 on timeline 512, the points plotted by lines 524, 526 and/or 528 where they touch axes 502, 504, 506, 508 and 510, etc. Alternatively, some or all of these labels can be hidden until a user hovers a cursor (or brings the cursor close) over the relevant feature. Furthermore, such labels can be plotted close to the feature, close to the cursor, in a table and/or in some other manner/location. FIG. 5 also shows an example of such a table, 538, where metrics and associated values can be displayed. Table 538 has a single value column, which can be used to display, for example, the average of the various metrics over time period 522. Additional columns may be added to display other values or functions of values as desired.

Figure 6:
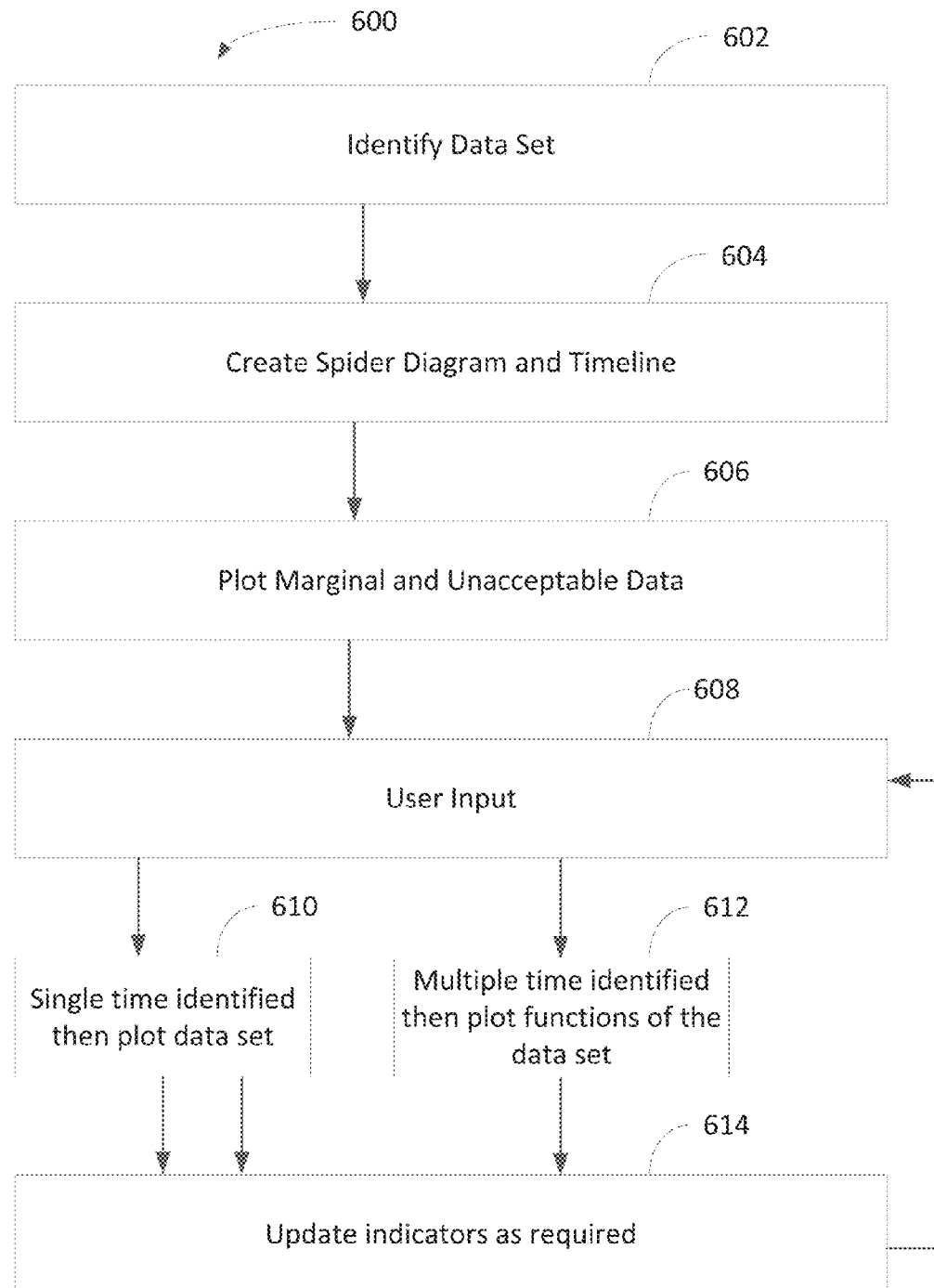
FIG. 6 illustrates an example of creating a timelined spider diagram and interface.

FIG. 6 illustrates an example of creating a timelined spider diagram and interface. The example 600 begins at 602 where the data collection is identified. There can be various ways to identify the data collection. The user may be asked for input in a variety of ways to identify the set of data that should be included. A user may choose, for example, to include the data for the last month or for the data that includes marginal or unacceptable values or whatever data is desired. In one example, the data is selected a-priori and a chart is made to present the information. In another example, the data collection is selected and then the user can interactively explore the data collection, perhaps as identified in the embodiments of FIG. 4 or FIG. 5.

Once the data collection is selected, the spider diagram and the timeline are created at 604. The spider diagram is created with one axis for each metric (data group) in the data collection. The minimum and maximum values for the metrics may be used to scale the axis of the spider diagram so that all values may be represented on the diagram. Alternatively, the values themselves may be scaled to some normalized value so they can be plotted on standard scaled axis. The timeline is created so that the minimum time and maximum time can contain the data (e.g. the minimum time should be less than or equal the smallest time value in the data collection and the maximum time should be greater than or equal the largest time value in the data collection). Appropriate labels and/or legends may also be included in the spider diagram and the timeline.

Once the spider diagram and timeline are created, the marginal and/or unacceptable data values in the data collection can be identified if desired at 606. As previously explained, criteria defining values for each metric that are considered marginal and/or unacceptable can identify the marginal and/or unacceptable data values in the collection. The relevant criteria can come, for example, from an SLA and/or from another source. The marginal and/or unacceptable data values can be plotted on the spider diagram or the timeline or both the spider diagram and the timeline.

As described, a variety of mechanisms can be used to identify marginal and/or unacceptable data values. Symbols, color coding (of either symbols, or portions of the spider diagram and/or timeline or other areas), line types, or any other visual mechanism can be used. Furthermore, these may be used either alone or in any combination.

Once marginal and/or unacceptable data values are plotted, if desired, when the timelined spider diagram is used to manage/explore the data, the system can wait for user input as indicated at 608. Although a variety of user input can be accommodated, the discussion herein focuses on input that identifies a portion of the data collection to be examined. One way to identify a portion of the data set to be examined is using the timeline to identify a single time (as in 610) or a time period (as in 612).

When a single time is identified in 610, the data can be plotted on the spider diagram as discussed elsewhere. This can include, for example, plotting the values of each metric at the identified time on its respective axis (and connecting them with lines). Appropriate labels, legends and/or other features may also be added.

When a time period (such as by identifying a start time and stop time) are identified in 612, functions of the data values for each metric can be plotted on the spider diagram. Example functions include things like minimum value, maximum value, average value, median value or other statistical measures, or any other function that can be created from multiple data values. These can be plotted alone or in any combination. In addition, calculated values can be displayed in tables or in another visual fashion. In addition, the selected time period can be identified on the timeline, such as by a start time marker and a stop time marker and/or by visually changing the potion of the timeline covered by the period.

When the appropriate data is plotted on the spider diagram and/or timeline as appropriate due to whatever user selection is made, other indicators can be updated as appropriate. This can include legends, labels, values, tables, or whatever else needs to be updated in accordance with the user selection. This is indicated at 614.

Figure 7:
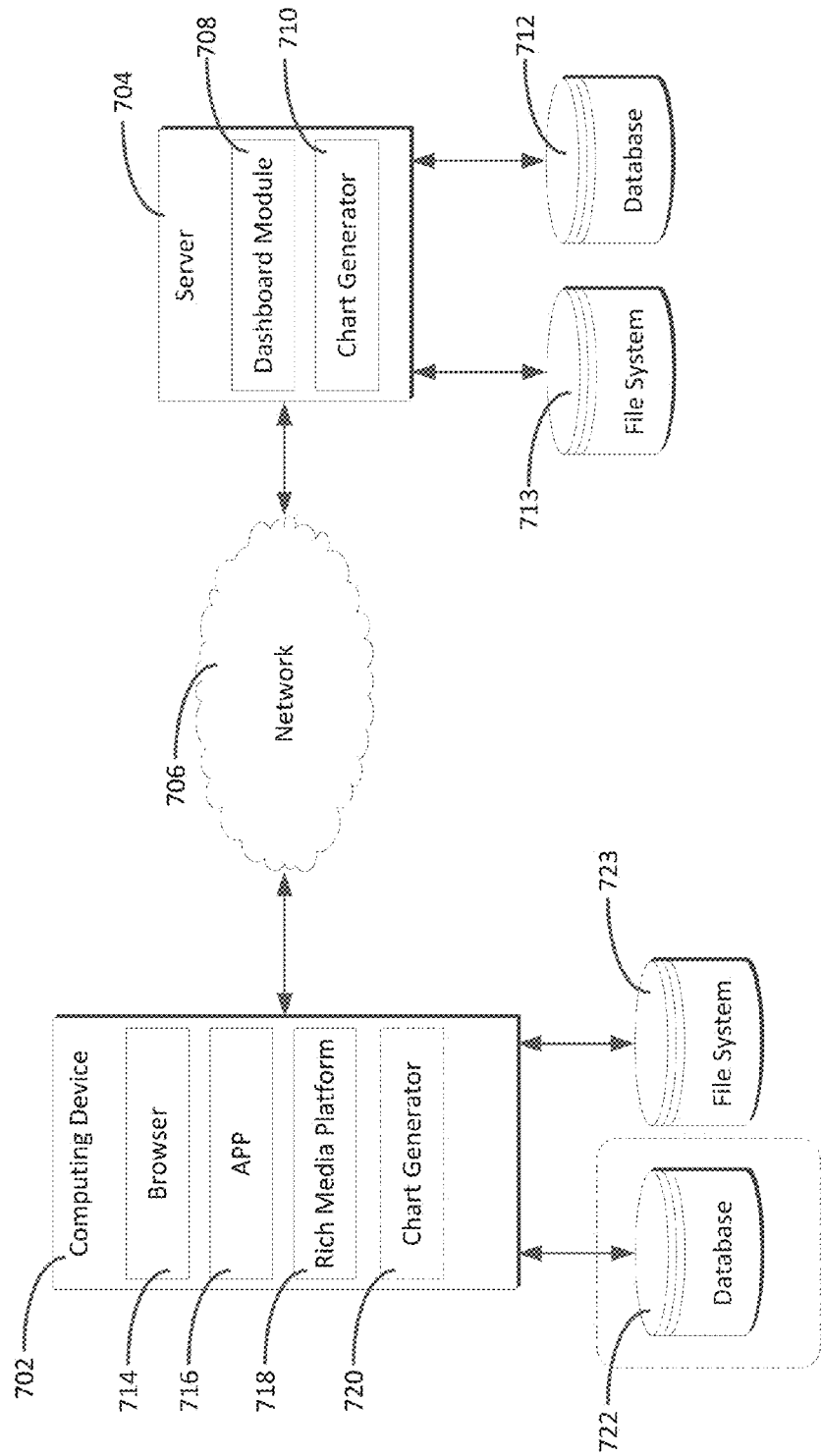
FIG. 7 illustrates an example embodiment to create timelined spider diagrams and interface.

FIG. 7 illustrates an example embodiment to create timelined spider diagrams and interface. In FIG. 7, a computing device 702 is connected to a server 704, perhaps over a network 706. In this embodiment, the computing device 702 can rely on the server 704 to create the timelined spider diagram and associated interface. For example, server 704 may have dashboard module 708 to serve up information that can be displayed and used on computing device 702. Dashboard module 708 may rely on other software to generate the appropriate charts, such as chart generator 710. In operation, chart generator 710 can retrieve the appropriate data collection from the location where it is stored, like database 712, for example. Chart generator can then generate the appropriate chart, which can be served up by dashboard module 708 to computing device 702.

Although the embodiment of FIG. 7 shows chart generator 710 retrieving the data collection from database 712, the data collection may also be stored in other locations and/or in other formats. For example, the data collection can be stored in a text file, a binary file, a comma separated value (CSV) file, an excel or other spreadsheet type file, or any file that can be manipulated by a program. Such a file may be stored on a disk or other location, as illustrated in FIG. 7 by file system 713, which may be accessed locally to server 704 or remotely from server 704.

Dashboard module 708 can serve information that can be used in a variety of client side environments. For example, dashboard module 708 may communicate with browser 714 of computing device 702 to display information and/or receive user input. Alternatively, or additionally, dashboard module 708 may communication with an application, such as application 716 of computing device 702 to display information and/or receive input. Although only a single computing device (e.g. 702) is illustrated in FIG. 7, server 704 can be connected to multiple such devices, which can be configured the same or differently.

Computing device 702 may include a rich media platform if required, such as Flash, Silverlight, or other platforms that allow display of rich media content. This is illustrated in FIG. 7 by 718.

Rather than relying on server 704, it is possible to build analysis capability into computing device 702 directly. This is illustrated in FIG. 7, for example by incorporating chart generator 720 directly on computing device 702 and giving computing device 702 access to the location where relevant data is stored, such as database 722. In this case, chart generator 720 can communicate directly with browser 714 and/or application 716 to display the relevant information and/or receive input. Alternatively, such functionality can be build directly into browser 714 (perhaps through a plug in) or into application 716. As yet another alternative, appropriate functionality of dashboard module 708 can also be incorporated into computing device 702.

Alternatively, or additionally, the relevant data may also be stored in other locations and/or in other formats. For example, the data collection can be stored in a text file, a binary file, a comma separated value (CSV) file, an excel or other spreadsheet type file, or any file that can be manipulated by a program. Such a file may be stored on a disk or other location, as illustrated in FIG. 7 by file system 723, which may be accessed locally to computing device 702 or remotely from computing device 702.

Embodiments described herein may be implemented in a variety of hardware and/or software configurations. An example embodiment extends to a machine in the example form of a computing device, such as that of FIG. 8, within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. In one embodiment, multiple such machines are utilized in a distributed network to implement multiple components in a transaction based environment. An object-oriented, service-oriented, or other architecture may be used to implement such functions and communicate between the multiple systems and components.

The machine may be a personal computer (PC), a tablet device, a Personal Digital Assistant (PDA), a cellular telephone or smartphone, a web appliance, etc. Further, while only a single machine is illustrated, the term "machine" shall also be taken to include any collection of machines that individually or jointly execute a set (or multiple sets) of instructions to perform any one or more of the methodologies discussed herein.

Figure 8:
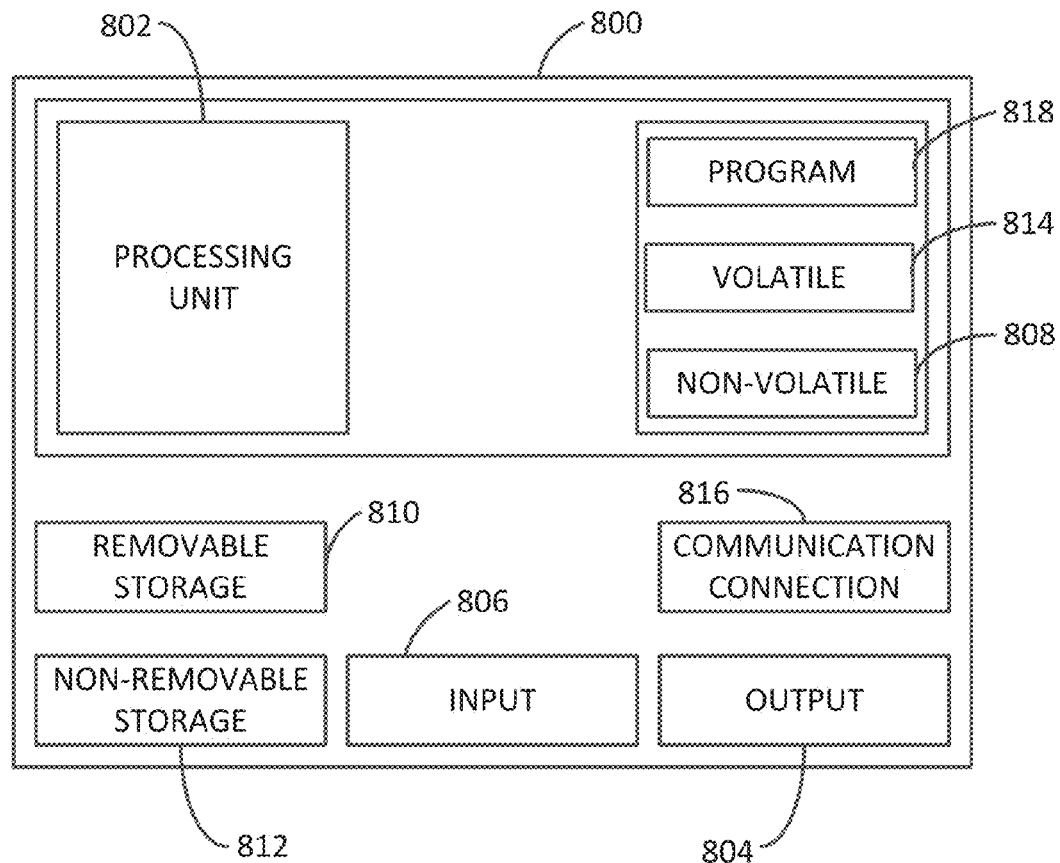
FIG. 8 illustrates an example embodiment of a device suitable for use herein.

An example machine 800 is illustrated in FIG. 8 and may include a processor 802 (e.g., a central processing unit (CPU), a graphics processing unit (GPU), advanced processing unit (APU) or any of the above in any combination), and memory of various forms. The machine may further include a display or other output 804 and an input device 806 such as keyboard, touch screen, various user interfaces such as on screen keyboards, gesture input, voice input, etc.

Machine-Readable Medium

Embodiments also may include machine-readable storage medium on which is stored one or more sets of instructions and data structures (e.g., collectively software instructions 818) embodying or used by any one or more of the methodologies or functions described herein. The instructions may also reside, completely or at least partially, within the memory or within the processor during execution thereof by the computer system, with the memory and the processor also constituting machine-readable media.

While the machine-readable storage medium may be shown in an example embodiment to be a single medium, the term "machine-readable storage medium" may include a single storage medium or multiple storage media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that cause the machine to perform any one or more of the methodologies of embodiments of the present application, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory 808, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. Any of which can be either removable storage 810 or non-removable storage 812, although some are typically found as one or the other (e.g. removable or non-removable). Machine-readable storage media may also include volatile memory 814.

Transmission Medium

The instructions may further be transmitted or received over a communications network using a transmission medium via a network interface device (using, for example communication connection 816) and utilizing any one of a number of well-known transfer protocols. Examples of communication networks include a local area network (LAN), a wide area network (WAN), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present application. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present application. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present application as represented by the appended claims. The specification and drawings are, accordingly, to be regarded in an illustrative rather than a restrictive sense.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

What is claimed is:

1. A method of coordinating display of multiple data groups, the method comprising:
    generating, on a computer display device, a timelined data output diagram that includes a displayed metric value axis for each of the data groups, wherein each of the metric value axes originate at a common point and extend radially from the common point;
    generating, on the computer display device, a timeline object that provides a user input interface, wherein the timeline object presents a time interval display that is set based on the data groups;
    displaying, on the computer display device, a first marker within the timelined data output diagram, wherein the first marker comprises a first display symbol associated with a metric-specific limit value, and wherein the first marker is positioned on one or more of the metric value axes based on where along a metric value axis a data group value exceeds a metric-specific limit;
    displaying, on the computer display device, a second marker at a position within the time interval display that corresponds to a time value at which the data group value exceeded the metric-specific limit, wherein the second marker comprises a second display symbol that substantially matches the first display symbol;
    receiving a first user input at a selected start time position within the timeline object;
    in response to said first user input, displaying a start time indicator on said timeline object at the selected start time position;
    receiving a second user input at a selected stop time position within the timeline object;
    in response to said second user input, displaying a stop time indicator on said timeline object at the selected stop time position; and
    in response to the first and second user inputs:
        changing the appearance of the timeline object between the start time indicator and the stop time indicator;
        identifying one or more marginal criteria values for each of the data groups and inserting markers corresponding to the marginal criterial values on the timeline object; and
        plotting on each of the metric value axes:
            a boundary value and a marginal criteria value for a respective data group within the time interval between the start time indicator and the stop time indicator, wherein the boundary value, the marginal criteria value, and the metric-specific limit are each different value types; and
            a statistic value for a respective data group, wherein the statistic value is determined based on data group values associated with times between time values corresponding to the start time indicator and the stop time indicator.

2. The method of claim 1, further comprising:
    plotting lines interconnecting the limit values; and
    plotting lines interconnecting the statistic values.

3. The method of claim 1 wherein the limit values includes a minimum value and maximum value, and wherein the statistic values includes an average value.

4. A system that coordinates display of multiple data groups, the system comprising:
    a processor, a memory device, a display device, and an input device; and
    instructions of a computer program product stored on the memory device, the instructions executable by the processor to cause the system to:
        generate, on a computer display device, a timelined data output diagram that includes a displayed metric value axis for each of the data groups, wherein each of the metric value axes originate at a common point and extend radially from the common point;
        generate, on the computer display device, a timeline object that provides a user input interface, wherein the timeline object presents a time interval display that is set based on the data groups;
        display, on the computer display device, a first marker within the timelined data output diagram, wherein the first marker comprises a first display symbol associated with a metric-specific limit value, and wherein the first marker is positioned on one or more of the metric value axes based on where along a metric value axis a data group value exceeds a metric-specific limit;
        display, on the computer display device, a second marker at a position within the time interval display that corresponds to a time value at which the data group value exceeded the metric-specific limit, wherein the second marker comprises a second display symbol that substantially matches the first display symbol;
        receive a first user input at a selected start time position within the timeline object;
        in response to said first user input, displaying a start time indicator on said timeline object at the selected start time position;
        receive a second user input at a selected stop time position within the timeline object;
        in response to said second user input, displaying a stop time indicator on said timeline object at the selected stop time position; and
        in response to the first and second user inputs:
            change the appearance of the timeline object between the start time indicator and the stop time indicator;
            identify one or more marginal criteria values for each of the data groups and inserting markers corresponding to the marginal criterial values on the timeline object; and
            plot on each of the metric value axes:
                a boundary value and a marginal criteria value for a respective data group within the time interval between the start time indicator and the stop time indicator, wherein the boundary value, the marginal criteria value, and the metric-specific limit are each different value types; and
                a statistic value for a respective data group, wherein the statistic value is determined based on data group values associated with times between time values corresponding to the start time indicator and the stop time indicator.

5. The system of claim 4, wherein the instructions further comprise instructions executable by the processor to cause the system to:
    plot lines interconnecting the limit values; and
    plot lines interconnecting the statistic values.

6. The system of claim 4, wherein the limit values includes a minimum value and maximum value, and wherein the statistic values includes an average value.

7. A computer program product that coordinates display of multiple data groups, the computer program product comprising:
    a non-transitory computer readable storage medium having computer readable program code embodied therewith, the computer program code configured to:
        generate, on a computer display device, a timelined data output diagram that includes a displayed metric value axis for each of the data groups, wherein each of the metric value axes originate at a common point and extend radially from the common point;

generate, on the computer display device, a timeline object that provides a user input interface, wherein the timeline object presents a time interval display that is set based on the data groups;

display, on the computer display device, a first marker within the timelined data output diagram, wherein the first marker comprises a first display symbol associated with a metric-specific limit value, and wherein the first marker is positioned on one or more of the metric value axes based on where along a metric value axis a data group value exceeds a metric-specific limit;

display, on the computer display device, a second marker at a position within the time interval display that corresponds to a time value at which the data group value exceeded the metric-specific limit, wherein the second marker comprises a second display symbol that substantially matches the first display symbol;

receive a first user input at a selected start time position within the timeline object;

in response to said first user input, displaying a start time indicator on said timeline object at the selected start time position;

receive a second user input at a selected stop time position within the timeline object;

in response to said second user input, displaying a stop time indicator on said timeline object at the selected stop time position; and in response to the first and second user inputs:
  change the appearance of the timeline object between the start time indicator and the stop time indicator;
  identify one or more marginal criteria values for each of the data groups and inserting markers corresponding to the marginal criterial values on the timeline object; and
  plot on each of the metric value axes:
    a boundary value and a marginal criteria value for a respective data group within the time interval between the start time indicator and the stop time indicator, wherein the boundary value, the marginal criteria value, and the metric-specific limit are each different value types; and
    a statistic value for a respective data group, wherein the statistic value is determined based on data group values associated with times between time values corresponding to the start time indicator and the stop time indicator.

8. The computer program product of claim 7, wherein the computer program code is further configured to:
  plot lines interconnecting the limit values; and
  plot lines interconnecting the statistic values.

9. The computer program product of claim 7, wherein the limit values includes a minimum value and maximum value, and wherein the statistic values includes an average value.

* * * * *